United States Patent [19]
McMains et al.

[11] Patent Number: 5,639,245
[45] Date of Patent: Jun. 17, 1997

[54] METHOD OF MANUFACTURING A TEACHING TOOL INCLUDING POST-CONSUMER MATERIAL FOR USE IN EDUCATING IN THE BENEFITS OF RECYCLING

[75] Inventors: Geraldine B. McMains, Huntington Beach; Manny Greenfield, Culver City, both of Calif.

[73] Assignee: Post-Consumer Products, Newport Beach, Calif.

[21] Appl. No.: 639,429

[22] Filed: Apr. 29, 1996

Related U.S. Application Data

[63] Continuation of Ser. No. 286,138, Aug. 4, 1994, abandoned.
[51] Int. Cl.⁶ ..................................................... G09B 25/00
[52] U.S. Cl. .............................. 434/365; 446/87; 446/385; 206/457; 428/903.3
[58] Field of Search ........................................ 434/365, 369, 434/295, 296, 297, 393, 433; 446/424, 427, 88, 87, 93, 94, 73, 74, 385; 206/457; 428/2, 903.3; 40/310

[56] References Cited

U.S. PATENT DOCUMENTS

| | | | |
|---|---|---|---|
| 1,647,175 | 11/1927 | Grunberg | 40/310 X |
| 2,352,361 | 6/1944 | Ballestero | 434/433 |
| 2,498,074 | 2/1950 | Feldman . | |
| 2,730,827 | 1/1956 | Patterson | 446/88 |
| 3,154,882 | 11/1964 | Bossiere . | |
| 4,204,361 | 5/1980 | Chaput | 446/74 |
| 4,842,140 | 6/1989 | Mesnard | 206/457 |
| 4,964,831 | 10/1990 | Wolff | 446/73 |
| 5,224,894 | 7/1993 | Nelson et al. | 446/73 |
| 5,261,848 | 11/1993 | Kaplan et al. | 446/74 |
| 5,366,227 | 11/1994 | Duffy | 273/287 |

*Primary Examiner*—Jeffrey A. Smith
*Attorney, Agent, or Firm*—Lyon & Lyon

[57] ABSTRACT

A teaching tool for teaching consumers and, in particular, children the benefits of recycling. In one embodiment, a teaching tool in accordance with the present invention comprises an object (for example, a toy) and a package for the object, wherein the package comprises a source material which may be recycled, and the object is manufactured at least in part from recycled source material.

1 Claim, 1 Drawing Sheet

METHOD OF MANUFACTURING A TEACHING TOOL INCLUDING POST-CONSUMER MATERIAL FOR USE IN EDUCATING IN THE BENEFITS OF RECYCLING

This is a continuation of application Ser. No. 08/286,138, filed on Aug. 4, 1994 (now abandoned) and which designated the U.S.

BACKGROUND

The field of the present invention is teaching tools and methods and, in particular, tools and methods for helping children understand the concept of recycling.

Recently, substantial attention has focused on the benefits achievable through large-scale recycling operations. Indeed, recent estimates indicate that recycling will soon become an $18 billion dollar per year industry within the United States.

Although the recycling industry appears to be growing at a rapid rate, the industry remains highly dependent upon consumer awareness. Moreover, if the average consumer is unaware of the recycling opportunities available to him or her on a daily basis, that consumer cannot be expected to participate in a meaningful manner in the recycling of used goods. It is also a commonly accepted fact that, once a consumer develops a habit with respect to the disposal of used goods, that habit may be difficult to break. For example, teaching consumers to separate recyclable and non-recyclable trash can be a formidable task, when those consumers have, for years, disposed of all of their trash in a single can or bin. It follows that, if we desire to achieve the maximum benefits available through recycling, teaching consumers to recycle used goods at an early age must become a fundamental tenet of our ecological policy agenda. For this reason, it is believed that the recycling industry would find the provision of one or more tools to teach consumers and, in particular, children the benefits of recycling to be highly desirable.

SUMMARY OF THE INVENTION

The present invention is directed to a tool and method for teaching consumers and, in particular, children the benefits of recycling. In one embodiment, a teaching tool in accordance with the present invention comprises an object (for example, a toy) and a package for the object, wherein the package comprises a source material which may be recycled, and the object is manufactured at least in part from the recycled source material. It thus will be understood that a teaching tool in accordance with the present invention may be used to assist consumers and, in particular, children in understanding the relationship between a source material, for example, plastic and a recycled end product, for example, fabric or cloth.

In another embodiment a teaching tool in accordance with the present invention may comprise a toy doll and package comprising a plastic bottle, wherein the toy doll is manufactured at least in part from fabric or cloth which has been produced by recycling plastic bottles similar to the plastic bottle comprising the package.

In still another aspect, the present invention may comprise a method for teaching consumers and, in particular, children the benefits of recycling. A teaching method in accordance with the present invention might include, for example, the steps of manufacturing a toy doll from a fabric produced from recycled plastic bottles; disposing the toy doll in a plastic bottle resembling the bottles which were recycled to produce the fabric; and removing the toy doll from the plastic bottle to show children, both figuratively and literally, that the toy doll may be produced from the bottle.

It is an object of the present invention to provide a teaching tool and method for assisting consumers and, in particular, children to understand the benefits of recycling.

It is also an object of the present invention to provide a teaching tool and method to aid teachers in explaining to children that trash, such as plastic bottles, may be recycled to form useful materials, such as fabrics which may be made into dolls or other useful articles.

DESCRIPTION OF THE PREFERRED EMBODIMENT

Figure 1:
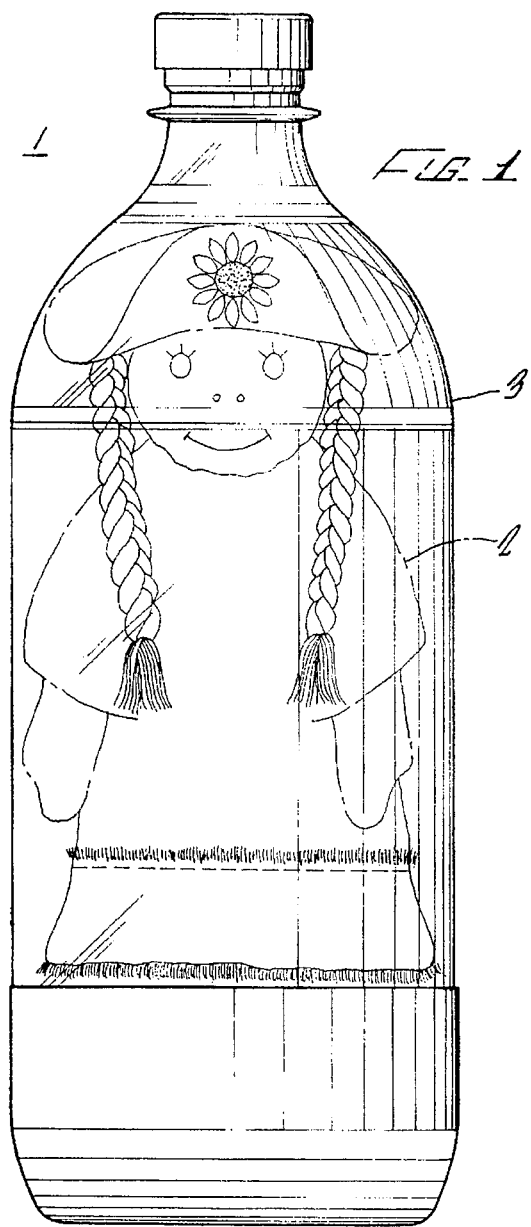
FIG. 1 is an illustration of a teaching tool in accordance with a preferred form of the present invention.
Figure 2:
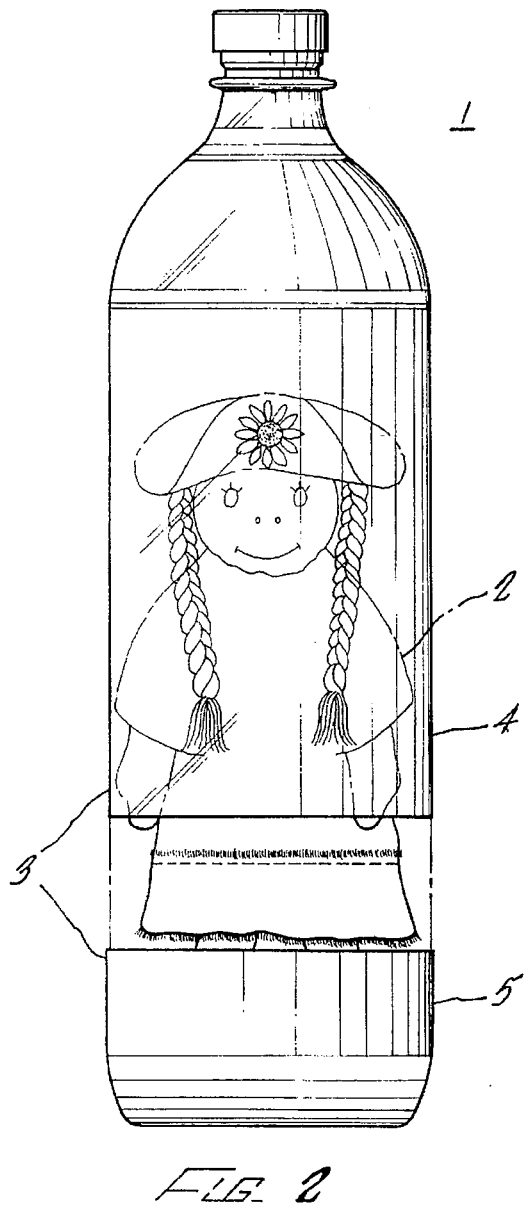
FIG. 2 is another view of the teaching tool illustrated in FIG. 1, wherein a packaging member comprising the teaching tool illustrated in FIG. 1 is depicted in an open configuration.

Turning now to the drawings, FIGS. 1 and 2 provide an illustration of a teaching tool 1 in accordance with a preferred form of the present invention. As shown in FIGS. 1 and 2, the teaching tool 1 comprises a toy doll 2 and a package 3 comprising a plastic bottle. The fabric or cloth comprising the doll 2 comprises ECOSPUN™, a product manufactured from recycled plastic bottles by Wellman, Inc., of Johnsonville, S.C. Accordingly, the teaching tool 1 may be used to show consumers and, in particular, children that plastic bottles may be recycled and used to produce other useful products, such as the fabric from which the doll 2 is manufactured.

The teaching tool 1 illustrated in FIGS. 1 and 2 may be used to show consumers and, in particular, children that plastic bottles similar to the plastic bottle comprising the package 3 of the toy doll 2 may be recycled to produce fabric which, in turn, may be made into the toy doll 2 or another useful article. As shown in FIG. 2, in a preferred form the package 3 comprises a clear plastic upper portion 4 and an opaque base portion 5 of a standard plastic soda bottle. The upper portion 4 and the base portion 5 of the bottle comprising the package 3 are configured such that they may be detachably coupled to one another by sliding the upper portion 4 into the base portion 5. When the upper portion 4 and the base portion 5 are coupled together, the soda bottle provides a secure package 3 for the toy doll 2, and children cannot touch or play with the doll without first opening the package 3. Thus, by allowing children to open the package 3 by separating the upper portion 4 of the bottle from the base portion 5, and explaining to those children how the bottle may be recycled to create the fabric from which the toy doll 2 is made, it is possible to show children (or any other consumer) that useful products, for example, the toy doll 2, may be produced by recycling plastic soda bottles, just as the toy doll 2 is "produced" upon separating the upper portion 4 from the base portion 5 of the bottle comprising the package 3.

Those skilled in the art will appreciate that in a less preferable method for educating children with regard to the benefits of recycling, the toy doll 2 need not necessarily be manufactured from a fabric produced from recycled plastic soda bottles, so long as when the toy doll 2 and package 3 (i.e. the soda bottle container) are provided to children, it is explained to those children that the toy doll 2 might be manufactured from fabric produced by recycling plastic soda bottles.

While the invention is susceptible to various modifications and alternative forms, a specific example thereof has been shown by way of example in the drawings and is herein described in detail. It should be understood, however, that the invention is not to be limited to the particular form disclosed, but to the contrary, the invention is to cover all modifications, equivalents, and alternatives falling with the spirit and scope of the appended claims.

What is claimed is:

1. A method of manufacturing a teaching tool, said tool being useful for educating children and other consumers about the benefits of recycling, said method comprising the steps of:

assembling a doll substantially from a post-consumer recycled polyester fabric, said post-consumer recycled polyester fabric having been produced in substantial part from plastic soda bottles;

adapting a plastic soda bottle to provide a package for said doll, said plastic soda bottle being similar in material composition to said soda bottles from which said post-consumer recycled polyester fabric is produced; and positioning said doll within said package;

whereby said doll and said package may be used as a teaching tool to educate children and other consumers with regard to the benefits of recycling.

* * * * *